United States Patent
Mitamura et al.

(10) Patent No.: US 7,985,359 B2
(45) Date of Patent: Jul. 26, 2011

(54) TIRE VULCANIZING APPARATUS AND TIRE VULCANIZING METHOD

(75) Inventors: Hisashi Mitamura, Takasago (JP); Kazuto Okada, Kobe (JP); Hideaki Kuwabara, Kobe (JP); Tomomichi Murata, Takasago (JP); Masatake Toshima, Kobe (JP); Yasuhiko Fujieda, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 156 days.

(21) Appl. No.: 12/517,611

(22) PCT Filed: Dec. 4, 2007

(86) PCT No.: PCT/JP2007/073392
§ 371 (c)(1),
(2), (4) Date: Jun. 4, 2009

(87) PCT Pub. No.: WO2008/069197
PCT Pub. Date: Jun. 12, 2008

(65) Prior Publication Data
US 2010/0007038 A1    Jan. 14, 2010

(30) Foreign Application Priority Data

Dec. 5, 2006 (JP) .................................. 2006-328178

(51) Int. Cl.
*B29C 35/04* (2006.01)
(52) U.S. Cl. ...... 264/40.3; 264/40.6; 264/315; 264/501; 425/29; 425/42
(58) Field of Classification Search .................. 425/29, 425/40, 42, 43; 264/40.1, 40.3, 40.6, 501, 264/315, 326
See application file for complete search history.

(56) References Cited

U.S. PATENT DOCUMENTS

| 3,579,626 | A | * | 5/1971 | Brittain | 425/43 |
| 4,422,987 | A | * | 12/1983 | Arimatsu | 264/40.1 |
| 5,055,245 | A | * | 10/1991 | Hisatomi et al. | 425/29 |
| 5,256,348 | A | * | 10/1993 | Waller | 425/29 |

(Continued)

FOREIGN PATENT DOCUMENTS

JP    62 211109    9/1987

(Continued)

*Primary Examiner* — James Mackey
(74) *Attorney, Agent, or Firm* — Oblon, Spivak, McClelland, Maier & Neustadt, L.L.P.

(57) ABSTRACT

A tire vulcanizing apparatus and a tire vulcanizing method, by which the pressure and temperature of a heating and pressurizing medium to be supplied to the internal space of a raw tire can be controlled without the condition of pressure being affected by the condition of temperature. The tire vulcanizing apparatus has: a medium path, connected to an internal space of a raw tire, for passing a heating and pressurizing medium; a pressure sensor, provided in the medium path, for measuring a pressure of the heating and pressurizing medium; a pressure control valve for controlling a pressure of the heating and pressurizing medium passing through the medium path on the basis of a signal from the pressure sensor; a temperature sensor, provided in the medium path, for measuring a temperature of the heating and pressurizing medium; and a heating unit for controlling the temperature of the heating and pressurizing medium passing through the medium path on the basis of a signal from the temperature sensor, wherein the pressure control valve and the heating unit control the pressure and temperature of the heating and pressurizing medium supplied from the medium path to the internal space of the raw tire respectively and independently.

10 Claims, 5 Drawing Sheets

U.S. PATENT DOCUMENTS

| | | | |
|---|---|---|---|
| 6,802,998 B2 * | 10/2004 | Ono | 264/315 |
| 7,001,559 B2 * | 2/2006 | Oobayashi et al. | 264/315 |
| 7,435,069 B2 * | 10/2008 | Okada et al. | 425/42 |
| 7,604,760 B2 * | 10/2009 | Christopher et al. | 425/29 |
| 2004/0247717 A1 | 12/2004 | Okada et al. | |
| 2006/0012076 A1 * | 1/2006 | Caretta et al. | 264/326 |

FOREIGN PATENT DOCUMENTS

| | | | |
|---|---|---|---|
| JP | 63-037905 | * | 2/1988 |
| JP | 5 077249 | | 3/1993 |
| JP | 11 348040 | | 12/1999 |
| JP | 2002 11722 | | 1/2002 |
| JP | 2005 022399 | | 1/2005 |

* cited by examiner

RELATIONSHIP BETWEEN VULCANIZATION TIME t AND
TIRE TEMPERATURE T WHEN FORMING 205/60 R15 TIRE

TIRE VULCANIZING APPARATUS AND TIRE VULCANIZING METHOD

TECHNICAL FIELD

The present invention relates to a tire vulcanizing apparatus and tire vulcanizing method. More specifically, the present invention relates to a tire vulcanizing apparatus and tire vulcanizing method whereby the pressure and temperature of a heating and pressurizing medium for vulcanizing and molding a raw tire can be controlled respectively and independently.

BACKGROUND ART

Conventionally, in a bladder type tire vulcanizing apparatus, for example, an expandable and contractable bladder made of a material having elasticity (for example, butyl rubber) is introduced inside a raw tire, the bladder and the raw tire are accommodated in a mold by mold clamping, and a heated and pressurized medium, such as water vapor or nitrogen gas, or the like, at high temperature and high pressure is supplied into the bladder, thereby causing the bladder to expand and make tight contact with the inner surfaces of the raw tire. The introduction time of the water vapor in the initial period at the start of vulcanization and the introduction time of the nitrogen gas in the latter period of the vulcanization process, and the like, are set appropriately in such a manner that the internal temperature of the raw tire, in other words, the internal temperature of the bladder becomes a desired temperature. In this state, the raw tire is pressed against the inside of the mold by the expanding force of the bladder while the interior of the raw tire (the interior of the bladder) is held at a desired temperature and pressure. The raw tire is then vulcanized and molded by holding this state until a desired vulcanizing reaction has progressed and completed from the outer side through to the inner side of the raw tire.

Here, the technology disclosed in Patent Document 1 is one technology relating to a tire vulcanizing apparatus such as that described above. This prior art technology is described below.

Patent Document 1 discloses technology relating to a tire vulcanizing apparatus in which a heating and pressurizing medium which is replenished into the interior of a bladder and the replenished medium is heated by means of the heating and pressurizing medium expelled from the bladder after the vulcanization and molding of a raw tire. The tire vulcanizing apparatus disclosed in Patent Document 1 comprises: a preheater which preheats a heating and pressurizing medium for vulcanizing and molding a raw tire, a hot/cool separating device which extracts the hot component of the heating and pressurizing medium by using the pressure energy of the heating and pressurizing medium which is expelled from the bladder after vulcanizing and molding a raw tire, and a heat exchanger which heats the heating and pressurizing medium replenished into the bladder by heat exchange with the aforementioned hot component. Furthermore, Patent Document 1 discloses technology which aims to achieve a uniform pressure of the heating and pressurizing medium that flows inside the bladder by providing a pressure gauge to the upstream side of the preheater. By means of this technology, it is possible readily to raise or lower the filling amount of the high-pressure heating and pressurizing medium which is replenished into the bladder, and consequently Patent Document 1 states that it is possible to stabilize the pressure of the heating and pressurizing medium inside the raw tire.

However, in the tire vulcanizing apparatus described in Patent Document 1, for example, if water vapor is used as the heating and pressurizing medium which is supplied into the bladder, in other words, into the raw tire, then there are cases where it is not possible to obtain a desired water vapor pressure due to the relationship between the saturated water vapor pressure and the saturation temperature. For example, if the type of tire being vulcanized has a compound which it is wished to vulcanize at low temperature (a type of rubber used in the ground-contacting surface of the tire), or the like, then it is possible to lower the temperature inside the bladder by reducing the supply pressure of the water vapor forming the heating and pressurizing medium. However, in this case, the water vapor supply pressure falls and consequently it becomes impossible to press the raw tire sufficiently against the inner surfaces of the mold. Consequently, the application of the intended design to the outer surface of the tire, in other words, the transfer of a pattern to the outer surface of the tire is insufficient and therefore defects occurs in the outer appearance of the tire.

Furthermore, the tire vulcanizing apparatus according to the prior art includes problems such as air blockages. These air blockages give rise to defects in the external appearance of the tire and tire molding defects due to insufficient expulsion to the exterior of the tire of the air present between the inner surfaces of the mold and the outer surfaces of the raw tire and between the inner surfaces of the raw tire and the outer surface of the bladder, the air present inside the raw tire, or the reaction gas generated during the vulcanization reaction, as a result of insufficient pressing force of the bladder pushing the raw tire against the inner surfaces of the mold.

Furthermore, since the raw tire is constituted by joining together or bonding together various members, then the tensile strength of the members is not necessarily uniform in the outer circumferential direction and breadthways direction of the tire. Consequently, if the pressure inside the bladder, in other words, the pressure inside the internal space of the raw tire, rises suddenly after the raw tire has been mounted in the mold, then the expansion of the raw tire in the outer circumferential direction does not occur uniformly and as a result of this, problems arise in that the uniformity of the tire, such as the tire balance, declines. Another possible way of avoiding this problem is to increase the time period of the pressure rise of the heating and pressurizing medium, but in this case, the rise in the internal temperature of the bladder becomes slower and therefore the vulcanization and molding time becomes longer, leading to other problems, such as decline in productivity.

[Patent Document 1] Japanese Patent Application Publication No. 2005-22399

DISCLOSURE OF THE INVENTION

The present invention was devised in view of the circumstances described above, an object thereof being to provide a tire vulcanizing apparatus and a tire vulcanizing method whereby the pressure and temperature of a heating and pressurizing medium which is supplied to the internal space of a raw tire can be controlled without one being affected by the condition of the other.

In order to achieve the aforementioned object, the tire vulcanizing apparatus according to the present invention includes: a mold for removably accommodating a raw tire; a medium path, connected to an internal space of the raw tire accommodated in the mold, for passing a heating and pressurizing medium of a gas or air for vulcanizing and molding the raw tire; a pressure sensor, provided in the medium path, for measuring a pressure of the heating and pressurizing medium; a pressure control valve, provided in the medium path, for controlling the pressure of the heating and pressurizing medium passing through the medium path on the basis of a signal from the pressure sensor; a temperature sensor, provided in the medium path, for measuring a temperature of the heating and pressurizing medium; and a heating unit, provided in the medium path, for controlling the temperature of the heating and pressurizing medium passing through the medium path on the basis of a signal from the temperature sensor, wherein the pressure and temperature of the heating and pressurizing medium supplied from the medium path to the internal space of the raw tire can be controlled respectively and independently, by the pressure control valve and the heating unit.

Furthermore, the tire vulcanizing method relating to the present invention includes: a pressure measurement step of measuring a pressure of a heating and pressurizing medium by means of a pressure sensor provided in a medium path for passing a heating and pressurizing medium of a gas or air for vulcanizing and molding a raw tire, the medium path being connected to an internal space of the raw tire; a pressure control step of controlling the pressure of the heating and pressurizing medium on the basis of a signal from the pressure sensor by means of a pressure control valve provided in the medium path; a temperature measurement step of measuring a temperature of the heating and pressurizing medium by means of a temperature sensor provided in the medium path; and a temperature control step of controlling the temperature of the heating and pressurizing medium by means of a heating unit provided in the medium path on the basis of a signal from the temperature sensor, wherein the pressure and temperature of the heating and pressurizing medium supplied from the medium path to the internal space of the raw tire are controlled respectively and independently in the pressure control step and the temperature control step.

BEST MODE FOR CARRYING OUT THE INVENTION

Below, preferred embodiments of the present invention are described with reference to the drawings. In the description given below, a tire vulcanizing method relating to the present invention is also described in addition to describing an embodiment of the tire vulcanizing apparatus according to the present invention.

First Embodiment

Figure 1:
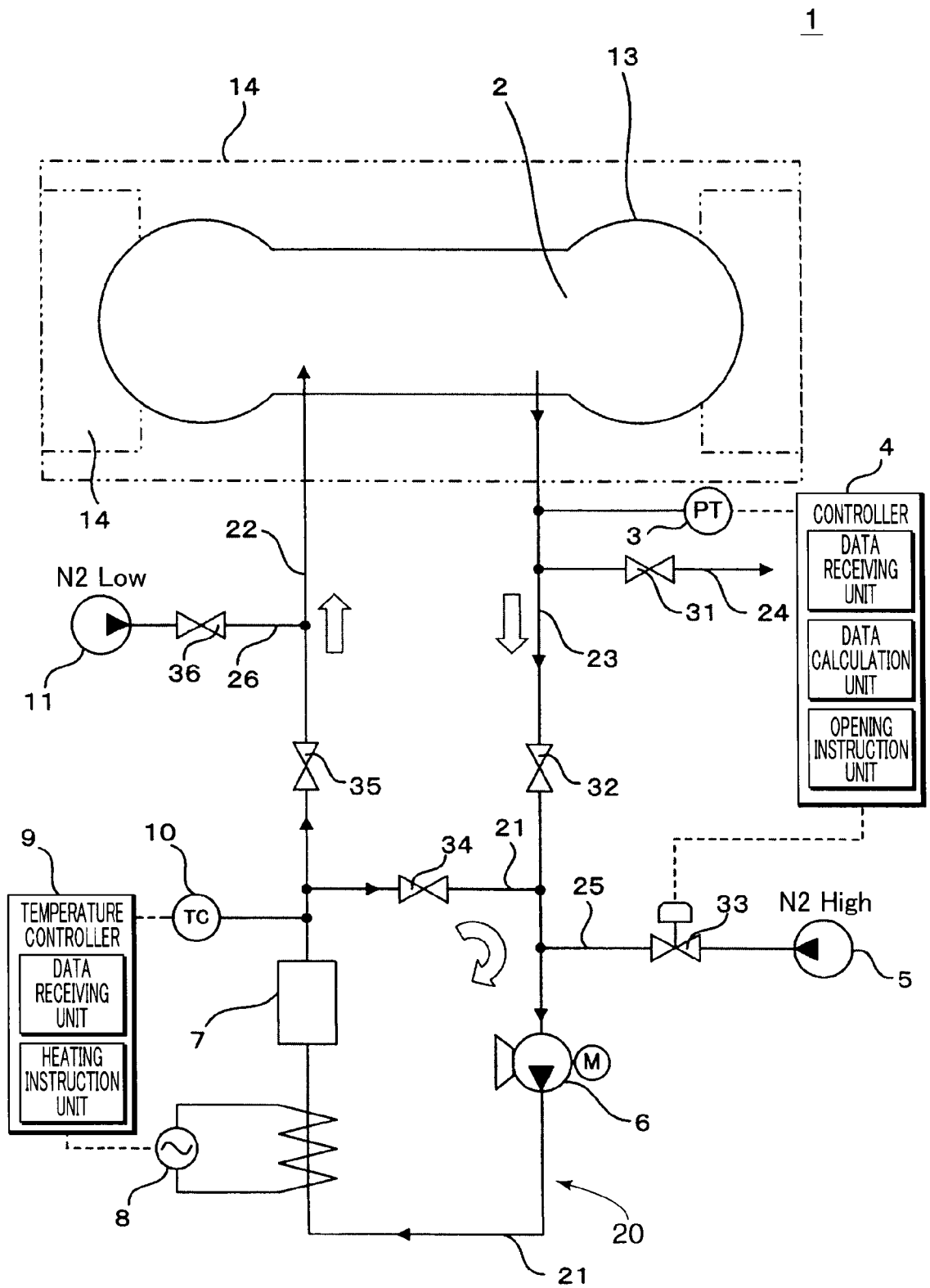
FIG. 1 is a schematic drawing showing a first embodiment of a tire vulcanizing apparatus relating to the present invention.

As shown in FIG. 1, the tire vulcanizing apparatus 1 relating to a first embodiment of the present invention comprises a mold 14 which removably accommodates a raw tire 13, and a medium path 20 through which a heating and pressurizing medium for vulcanizing and molding the raw tire 13 is channeled. The heating and pressurizing medium consists of a gas such as an inert gas, or air, or a mixed gas combining these.

Here, the medium path 20 comprises: a medium circulation path 21 for circulating the heating and pressurizing medium in order to preheat the heating and pressurizing medium; a medium supply path 22, provided so as to link the medium circulation path 21 and the internal space 2 of the raw tire, for supplying the heating and pressurizing medium from the medium circulation path 21 to inside the internal space 2 of the raw tire; and a medium recovery path 23, provided so as to link the medium circulation path 21 with the internal space 2 of the raw tire, for recovering the heating and pressurizing medium from the internal space 2 of the raw tire to the medium circulation path 21. In other words, the end of the medium supply path 22 which is opposite to the end connected to the medium circulation path 21 is linked to the internal space 2 of the raw tire, and end of the medium recovery path 23 which is opposite to the end connected to the medium circulation path 21 is linked to the internal space 2 of the raw tire. In the description given below, including the other embodiments, the explanation relates to an example in which nitrogen gas is used as a heating and pressurizing medium.

If saturated water vapor is used as the heating and pressurizing medium as in the prior art, then due to the interdependence between the pressure and temperature of the water vapor, it is difficult to control the pressure and temperature respectively and independently, but if a nitrogen gas is used as the heating and pressurizing medium as in the following description, then since there is hardly any interdependence between the pressure and temperature of the nitrogen gas, it is possible to control the pressure and temperature respectively and independently. Therefore, in the present embodiment, it is possible to achieve independent control of the pressure and temperature of the heating and pressurizing medium as described below, by using nitrogen gas as the heating and pressurizing medium. Nitrogen gas is one example of a heating and pressurizing medium, and it is also possible to use a gas other than nitrogen gas, or air, or the like, as the heating and pressurizing medium, provided that it has virtually no interdependence between the pressure and temperature.

Furthermore, an expandable and contractable bladder (not illustrated) made of a material having elastic properties (for example, butyl rubber) is disposed inside the raw tire 13 which has been accommodated inside the mold 14. The bladder is caused to expand by supplying a high-temperature and high-pressure nitrogen gas to the interior of the bladder, in other words, the internal space 2 of the raw tire. Accordingly, the raw tire 13 is vulcanized and molded causing the bladder to make close contact with the inner wall surfaces of the raw tire 13, and causing the outer surfaces of the raw tire 13 to press against the inner surfaces of the mold 14 due to the expansive force of the bladder. It is also possible to apply the present invention to a bladder-less type of tire vulcanizing apparatus which does not use a bladder.

Furthermore, there are provided in the medium circulation path 21: a medium circulation apparatus 6 for circulating nitrogen gas; a temperature sensor 10 for measuring the temperature of the nitrogen gas; a heating unit 8 for controlling the temperature of the nitrogen gas which flows in the medium circulation path 21 and which is supplied to the internal space 2 of the raw tire, on the basis of a signal from the temperature sensor 10; a heat accumulator 7; and a bypass valve 34 which is provided in the portion of the medium circulation path 21 between the position connected to the medium supply path 22 and the position connected to the medium recovery path 23.

Furthermore, a high-pressure medium supply source path 25 branches from the medium circulation path 21 between the position where the medium recovery path 23 is connected and the position where the medium circulation apparatus 6 is provided, on the upstream side of the medium circulation apparatus 6 in terms of the direction of flow of the nitrogen gas. This high-pressure medium supply source path 25 is included in the concept of the medium supply source path of the present invention. Furthermore, a second pressure control valve 33 is provided in the high-pressure medium supply source path 25 and a high-pressure gas supply source 5 is connected to the upstream side of this second pressure control valve 33. This high-pressure gas supply source 5 supplies high-pressure nitrogen gas, and the high-pressure nitrogen gas thus supplied is introduced into the medium circulation path 21 via the high-pressure medium supply source path 25. The high-pressure gas supply source 5 is included in the concept of a heating and pressurizing medium supply source according to the present invention.

Furthermore, a medium supply valve 35 for dividing the medium circulation path 21 and the medium supply path 22 is provided in the medium supply path 22. Moreover, a low-pressure medium supply source path 26 branches from a position in between the medium supply valve 35 and the mold 14 in the medium supply path 22. A valve 36 is provided in this low-pressure medium supply source path 26, and a low-pressure gas supply source 11 is connected to the upstream side of this valve 36. The low-pressure gas supply source 11 supplies low-pressure nitrogen gas, and the low-pressure nitrogen gas thus supplied is introduced into the medium supply path 22 via the low-pressure medium supply source path 26.

Furthermore, a first pressure sensor 3 and a medium recovery valve 32 are provided in the medium recovery path 23. The first pressure sensor 3 measures the pressure of the nitrogen gas and is provided in the vicinity of the mold 14 in the medium recovery path 23. The medium recovery valve 32 divides off the medium recovery path 23 from the medium circulation path 21. Furthermore, an exhaust path 24 branches from the medium recovery path 23 at a position between the first pressure sensor 3 and the medium recovery valve 32. An exhaust valve 31 is provided in this exhaust path 24.

Here, the medium circulation apparatus 6 is a blower which is driven by an electric motor, for example. This medium circulation apparatus 6 is inverter-driven in such a manner that the volume of gas caused to circulate in the medium circulation path 21, in other words, the blowing rate, can be changed. Furthermore, the medium circulation apparatus 6 is used to circulate the nitrogen gas through the interior of the medium circulation path 21 in order to preheat the nitrogen gas, in order to supply nitrogen gas to the internal space 2 of the raw tire from the medium circulation path 21 and via the medium supply path 22, and in order to recover nitrogen gas into the medium circulation path 21 from the internal space 2 of the raw tire via the medium recovery path 23.

Here, the high-pressure gas supply source 5 is connected via the second pressure control valve 33 to the high-pressure medium supply source path 25 which branches from the medium circulation path 21 at a prescribed position to the upstream side of the medium circulation apparatus 6, in other words, on the input side of the medium circulation apparatus 6, as described above, and therefore when high-pressure nitrogen gas is supplied to the medium circulation path 21 from the high-pressure gas supply source 5 and via the second pressure control valve 33, this high-pressure nitrogen gas is supplied to the input side of the medium circulation apparatus 6. Consequently in the medium circulation apparatus 6, it is possible to suppress increase in the pressure differential in the nitrogen gas which corresponds to the difference between the output-side nitrogen gas pressure and the input-side nitrogen gas pressure. Consequently, it is possible to suppress increase in the load on the medium circulation apparatus 6.

The temperature sensor 10 measures the temperature of the nitrogen gas in the medium circulation path 21 and is constituted by a thermocouple, for example. As shown in FIG. 1, the temperature sensor 10 is provided in the direct vicinity of the point of connection of the medium circulation path 21 with the medium supply path 22. By this means, in either a state where nitrogen gas is able to pass between the medium circulation path 21, the medium supply path 22 and the medium recovery path 23, in other words, a state where the medium supply valve 35 and the medium recovery valve 32 are both open and the bypass valve 34 is closed, or a state where the medium circulation path 21 and the medium recovery path 23 are separated, in other words, a state where the medium supply valve 35 is open, the medium recovery valve 32 is closed and the bypass valve 34 is open, it is possible to measure the temperature of the nitrogen gas supplied to the internal space 2 of the raw tire accurately by means of the temperature sensor 10.

As described above, the heating unit 8 controls the temperature of the nitrogen gas supplied to the internal space 2 of the raw tire on the basis of a signal from the temperature sensor 10. For this heating unit 8, it is possible to use an induction heating unit, a sheath heater, a plate heater, a cartridge heater, a band heater or a casting heater, or the like.

The temperature controller 9 is a control apparatus which controls the heating power of the heating unit 8 by receiving a signal from the temperature sensor 10 and outputting an appropriate instruction to the heating unit 8 on the basis of this signal in such a manner that the nitrogen gas assumes a desired temperature. By controlling the heating power of the heating unit 8 by means of this temperature controller 9, the temperature of the nitrogen gas supplied from the medium circulation path 21 via the medium supply path 22 to the internal space 2 of the raw tire is controlled. The temperature control of the nitrogen gas carried out by controlling the heating power of the heating unit 8 by means of the temperature controller 9 is performed independently of the control of the pressure of the nitrogen gas which is carried out by controlling the degree of opening of the second pressure control valve 33 by means of the pressure controller 4 which is described below. This temperature controller 9 is included in the concept of a temperature controller according to the present invention.

Here, for example, the temperature controller 9 comprises a data receiver unit and a heating instruction unit, as shown in FIG. 1. The data receiver unit receives a temperature data signal from the temperature sensor 10 and the heating instruction unit sends an appropriate heating instruction to the heating unit 8 on the basis of the temperature data received by the data receiver unit, the desired temperature, and the heating time of the nitrogen gas, and the like. In the temperature measurement step, the temperature sensor 10 measures the temperature of the nitrogen gas flowing in the medium circulation path 21, and then in the temperature control step, the temperature controller 9 controls the heating of the nitrogen gas by the heating unit 8 on the basis of the signal from the temperature sensor 10 in such a manner that the nitrogen gas in the medium circulation path 21 assumes a desired temperature.

As described above, the first pressure sensor 3 measures the pressure of the nitrogen gas and is provided in the vicinity of the mold 14 in the medium recovery path 23. Therefore, the first pressure sensor 3 is able to measure a pressure which is substantially the same as the pressure of the internal space 2 of the raw tire, and it is possible to use the pressure data measured by the first pressure sensor 3 as a pressure signal which forms a basis of pressure control. Desirably, the first pressure sensor 3 is positioned as close as possible to the internal space 2 of the raw tire, within the bounds of possibility. Furthermore, the first pressure sensor 3 may also be located inside the internal space 2 of the raw tire.

The second pressure control valve 33 is a valve for controlling the pressure of the nitrogen gas supplied from the high-pressure gas supply source 5 to the medium circulation path 21, on the basis of the signal from the first pressure sensor 3. This second pressure control valve 33 controls the pressure of the nitrogen gas supplied to the internal space 2 of the raw tire from the high-pressure gas supply source 5 via the high-pressure medium supply source path 25, the medium circulation path 21 and the medium supply path 22. In the first embodiment, a pressure control valve is used as the second pressure control valve 33, but it is possible to use any valve which is capable of substantially controlling the pressure, for example, a flow rate control valve which controls the flow rate of the nitrogen gas. Furthermore, the second pressure control valve 33 may be an electronically controlled valve, or it may be a pneumatically operated valve. This also applies similarly to the first pressure control valve 37 which is used in the second embodiment described below.

The pressure controller 4 is a control apparatus which receives a signal from the first pressure sensor 3, and controls the degree of opening of the second pressure control valve 33 by issuing an appropriate instruction to the second pressure control valve 33 in such a manner that the pressure of the nitrogen gas assumes a desired pressure on the basis of this signal. The pressure of the nitrogen gas supplied to the internal space 2 of the raw tire is controlled by controlling the degree of opening of the second pressure control valve 33 by means of the pressure controller 4.

Here, for example, the pressure controller 4 comprises a data receiver unit, a data calculation unit and a degree of opening instruction unit, as shown in FIG. 1. The data receiver unit receives a pressure data signal from the first pressure sensor 3. The data calculation unit calculates the degree of opening of the second pressure control valve 33 on the basis of the pressure data received by the data receiver unit, the desired set pressure and the pressure rise time, and the like. The degree of opening instruction unit issues an instruction for the required degree of opening to the second pressure control valve 33, on the basis of the opening degree data obtained by calculation by the data calculation unit. In the pressure measurement step, the pressure of the nitrogen gas is measured by the first pressure sensor 3 in the vicinity of the mold 14 in the medium recovery path 23, and then in the pressure control step, the pressure controller 4 controls the pressure of the nitrogen gas supplied to the internal space 2 of the raw tire so as to assume a desired pressure, by adjusting the degree of opening of the second pressure control valve 33 on the basis of the signal from the first pressure sensor 3.

In the first embodiment, a pressure controller 4 which controls the pressure of the nitrogen gas and a temperature controller 9 which controls the temperature are provided independently, but instead of the pressure controller 4 and the temperature controller 9, it is also possible to provide one controller which has the function of both the pressure controller 4 and the temperature controller 9, and which is able to control both the pressure and temperature of the nitrogen gas. Furthermore, if a heating unit which is capable of altering the amount of heat supplied is used as the heating unit 8, then desirably, a data calculation unit which calculates the amount of heat to be supplied by the heating unit 8 on the basis of the received temperature data, the desired temperature, the heating time, and the like, is appended to the temperature controller 9.

By means of the temperature control step and the pressure control step described above, the pressure and temperature of the nitrogen gas supplied to the internal space 2 of the raw tire are controlled respectively and independently without any mutual relationship between the pressure and temperature. Accordingly, since the pressure of the internal space 2 of the raw tire can be controlled independently of the vulcanization temperature, then vulcanization of the raw tire 13 can be carried out at an optimal temperature in accordance with the compound of the tire, and hence the physical properties of the tire can be improved. Furthermore, as well as applying a design reliably to the tire, in other words, transferring a pattern to the tire, it is also possible to reduce external appearance defects and molding defects in the tire, such as the air blockages described above.

Furthermore, by controlling the pressure rise time, it is possible to vulcanize and mold a tire which has few distortions in the outer circumferential direction (the equatorial direction) and the breadthways direction of the tire, and therefore the uniformity of the tire, such as the tire balance, is improved. Moreover, since the temperature of the internal space 2 of the raw tire can be controlled independently of the pressure rise time, then it is possible to shorten the vulcanization time.

The heat accumulator 7 serves to accumulate heat and supply the accumulated heat to the nitrogen gas flowing inside it; the material used for the heat accumulator is carbon steel, SUS 420, or a high-conductivity material such as copper or aluminum. Furthermore, the heat accumulator 7 supplies the heat obtained from the high-temperature nitrogen gas in a complementary fashion to the low-temperature nitrogen gas, and by using the heat accumulator 7, a beneficial effect is obtained in that the heating time in the preheating of the nitrogen gas, and the like, can be shortened.

Next, the operation of the tire vulcanizing apparatus 1 relating to the present embodiment will be described. Firstly, a raw tire 13 is set in the mold 14 while introducing a bladder inside the raw tire 13 (not illustrated).

The valve 36 provided in the low-pressure medium supply source path 26 is opened and a low-pressure nitrogen gas is supplied from the low-pressure gas supply source 11 to the interior of the bladder, thereby expanding the bladder. When the interior of the bladder reaches a prescribed pressure, the valve 36 is closed and the raw tire 13 is thereby held in shape. Thereupon, the mold 14 is locked in a fully closed state and the clamping of the mold 14 is completed.

During the operation of accommodating the raw tire 13 in the mold 14, the nitrogen gas is preheated in the medium circulation path 21. In this case, the medium recovery valve 32 and the medium supply valve 35 are closed and the bypass valve 34 is opened. By opening and closing the respective valves, a closed circuit in which the nitrogen gas can be circulated for the purpose of preheating is formed inside the medium circulation path 21. The high-pressure nitrogen gas supplied from the high-pressure gas supply source 5 is introduced into the medium circulation path 21 via the second pressure control valve 33 and the high-pressure medium supply source path 25, and the nitrogen gas thus introduced is circulated in the medium circulation path 21 by the medium circulation apparatus 6. The nitrogen gas circulated inside the medium circulation path 21 is temperature adjusted so as to assume a desired temperature by the temperature control step. On the other hand, independently from the temperature control, the pressure of the nitrogen gas circulating in the medium circulation path 21 is controlled so as to assume a desired pressure by controlling the degree of opening of the second pressure control valve 33 by means of the pressure controller 4 and thereby introducing gas from the high-pressure medium supply source path 25 to the medium circulation path 21.

By preheating the nitrogen gas before it flows into the medium supply path 22 as described above, it is possible to shorten the rise time taken for the supply temperature of the nitrogen gas which is supplied to the internal space 2 of the raw tire immediately after the start of vulcanization to rise to a desired temperature. Furthermore, as described above, it is possible to adjust the pressure of the nitrogen gas to a desired pressure in the stage of preheating the nitrogen gas in the medium circulation path 21, and therefore it is possible to adjust the supply pressure of the nitrogen gas to the internal space 2 of the raw tire at the start of vulcanization to a desired supply pressure, in advance.

When it has been confirmed that the nitrogen gas has been heated to a desired temperature and clamping of the mold 14 has been completed, then the preheated nitrogen gas is supplied to the internal space 2 of the raw tire from the medium circulation path 21 via the medium supply path 22. In this case, the bypass valve 34 is closed and the medium supply valve 35 and the medium recovery valve 32 are opened, thereby supplying the nitrogen gas in the medium circulation path 21 to the internal space 2 of the raw tire via the medium supply path 22. In this way, the bladder is caused to expand by the high-temperature and high-pressure nitrogen gas supplied to the internal space 2 of the raw tire, in other words, to the interior of the bladder, and due to the expansive force of the bladder, the raw tire 13 is pressed against the inner wall surfaces of the mold 14 and is vulcanized and molded.

Desirably, the nitrogen gas used in this vulcanization and molding process is returned to the medium circulation path 21 from the internal space 2 of the raw tire via the medium recovery path 23. The nitrogen gas which has been returned to the medium circulation path 21 is heated again by the heating unit 8 and is then circulated and supplied to the internal space 2 of the raw tire via the medium supply path 22. In this case, the pressure control of the nitrogen gas, and more specifically, the control of the absolute value of the pressure of the nitrogen gas and the control of the pressure/time change of the nitrogen gas, is also performed by controlling the degree of opening of the exhaust valve 31, in addition to controlling the degree of opening of the second pressure control valve 33.

In this case, it is considered that the second pressure control valve 33 and the exhaust valve 31 are used selectively in the following manner, for instance. More specifically, if the nitrogen gas is circulated to the interior and exterior of the tire, the basic pressure control of the nitrogen gas is performed by adjusting the degree of opening of the second pressure control valve 33. However, if the exhaust valve 31 remains closed, then there is a risk of a problem occurring due to the high-pressure nitrogen gas supplied from the high-pressure gas supply source 5 flowing in reverse through the medium recovery valve 32 to the medium recovery path 23, and being supplied directly to the internal space 2 of the raw tire. Therefore, reverse flow of the high-pressure nitrogen gas as described above is prevented by controlling the back pressure inside the medium recovery path 23 by adjusting the degree of opening of the exhaust valve 31.

Second Embodiment

Next, the tire vulcanizing apparatus 101 and the tire vulcanizing method according to a second embodiment of the present invention will be described with reference to FIG. 2. In this description of the second embodiment, constituent elements which are the same as the first embodiment are labeled with the same reference numerals and further description thereof is omitted here.

Figure 2:
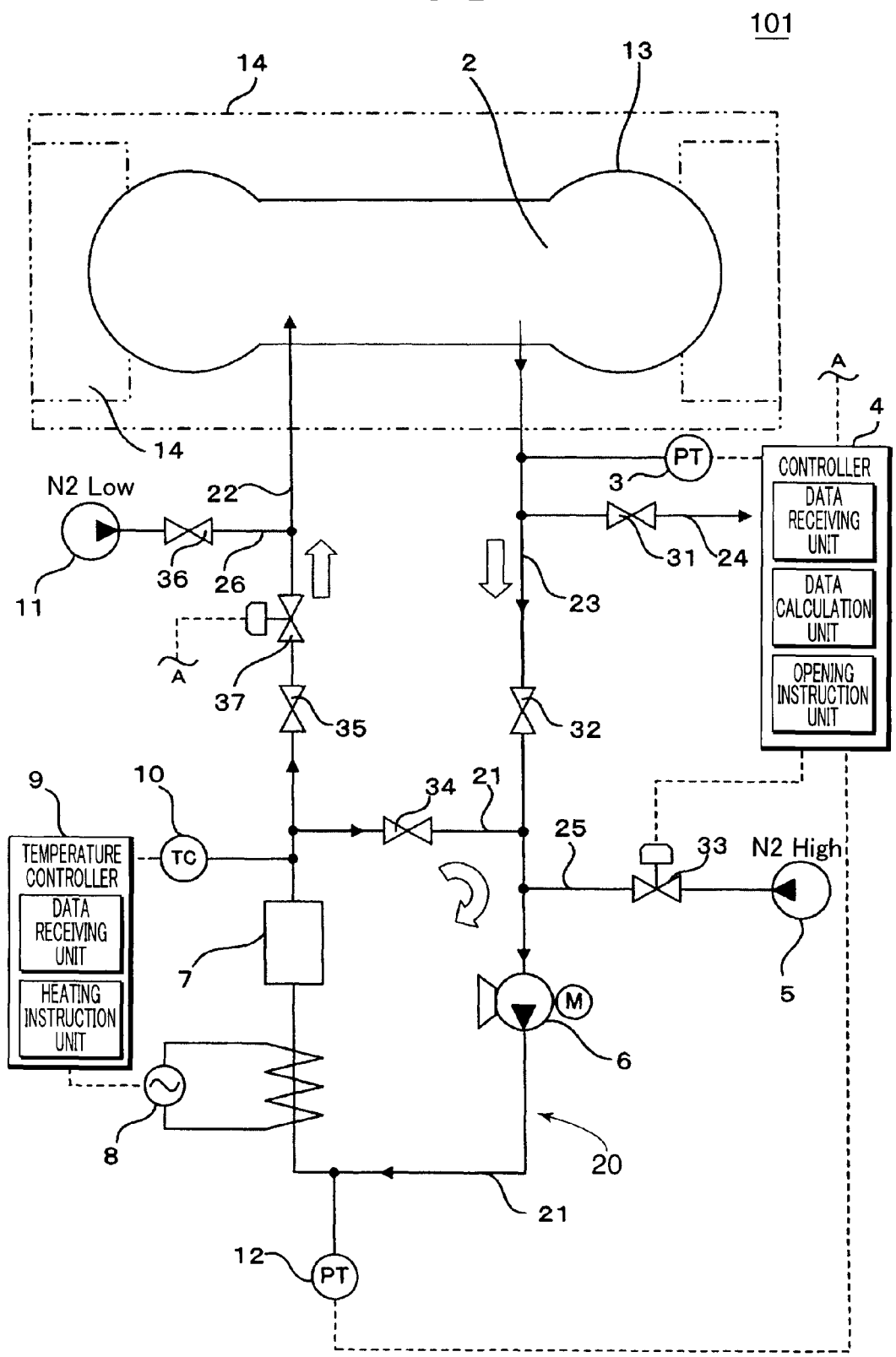
FIG. 2 is a schematic drawing showing a second embodiment of a tire vulcanizing apparatus relating to the present invention.

As shown in FIG. 2, in comparison with the tire vulcanizing apparatus 1 relating to the first embodiment, the tire vulcanizing apparatus 101 relating to the second embodiment further comprises a first pressure control valve 37 which is provided between the medium supply valve 35 and the mold 14 in the medium supply path 22 and a second pressure sensor 12 which is provided in the medium circulation path 21. In this second embodiment, rather than using the second pressure control valve 33 and the second pressure sensor 12, it is also possible to control the pressure of the nitrogen gas by means of the first pressure control valve 37 and the first pressure sensor 3. Furthermore, in this second embodiment, the medium supply valve 35 is provided in the medium supply path 22 between the position connected to the medium circulation path 21 and the position where the first pressure control valve 37 is provided.

In this second embodiment, due to the fact that the first pressure control valve 37 is also provided in the medium supply path 22 close to the position where the nitrogen gas is supplied to the internal space 2 of the raw tire in the medium path 20, then if the pressure of the nitrogen gas is controlled by using the first pressure control valve 37, it is possible to shorten the response time of the pressure change in the nitrogen gas in the internal space 2 of the raw tire with respect to this pressure control. Furthermore, by disposing the second pressure control valve 33 similarly to the first embodiment, it is possible to adjust the pressure of the nitrogen gas at the stage of preheating the nitrogen gas in the medium circulation path 21. Consequently, it also becomes possible to adjust the pressure of the nitrogen gas supplied to the internal space 2 of the raw tire at the start of vulcanization to a desired supply pressure in advance, and the pressure of the nitrogen gas in the internal space 2 of the raw tire can be controlled more readily.

In this second embodiment, the tire vulcanizing apparatus 101 also comprises a first pressure control valve 37 and a medium supply valve 35, but it is also possible to omit the medium supply valve 35 and provide a function which divides off the medium circulation path 21 and the medium supply path 22 in the first pressure control valve 37.

Simultaneously with opening the first pressure control valve 37 in cases where the medium supply valve 35 is opened or the medium supply valve 35 is omitted, the nitrogen gas is supplied to the internal space 2 of the raw tire via the medium supply path 22 and the vulcanization of the raw tire 13 starts. However, there is also a method in which the bypass valve 34 is opened and the medium recovery valve 32 is closed. In this case, firstly, the pressure of the high-pressure nitrogen gas which has built up pressure in the medium circulation path 21 is controlled by means of the first pressure control valve 37 on the basis of the signal from the first pressure sensor 3. As the nitrogen gas flows into the internal space 2 of the raw tire from the medium circulation path 21 and via the medium supply path 22, the pressure of the nitrogen gas inside the medium circulation path 21 as measured by the second pressure sensor 12 progressively falls, while the pressure of the nitrogen gas in the internal space 2 of the raw tire as measured by the first pressure sensor 3 progressively increases. This occurs in cases where the pressure of the nitrogen gas inside the medium circulation path 21 is higher than the pressure of the nitrogen gas in the internal space 2 of the raw tire.

Thereupon, the moment that the pressure of the nitrogen gas as measured by the first pressure sensor 3 and the pressure of the nitrogen gas as measured by the second pressure sensor 12 approach the same pressure, the bypass valve 34 is closed and the medium recovery valve 32 is opened. By this means, the nitrogen gas starts to be circulated through the medium circulation path 21, the medium supply path 22 and the medium recovery path 23. Thereafter, the pressure of the nitrogen gas is controlled subsequently by the second pressure control valve 33. In this case, the first pressure control valve 37 is set to a fully open state, and the supply pressure of the nitrogen gas to the internal space 2 of the raw tire which is set by this first pressure control valve 37 becomes higher than the control pressure of the nitrogen gas set by the second pressure control valve 33. By this means, it is possible to shorten the time taken for the pressure of the nitrogen gas inside the internal space 2 of the raw tire to reach the desired pressure.

If the medium recovery valve 32 is not closed but rather open as described above when the vulcanization of the raw tire 13 starts, then it is desirable to prevent the high-pressure nitrogen gas from flowing in reverse through the medium recovery path 23 from the medium recovery valve 32 side and flowing directly into the internal space 2 of the raw tire, by expelling the nitrogen gas via the exhaust path 24 while maintaining the back pressure by means of the exhaust valve 31. By this means, it is possible to circulate nitrogen gas at a desired pressure through the medium circulation path 21, the medium supply path 22 and the medium recovery path 23.

On the other hand, if the pressure of the nitrogen gas in the internal space 2 of the raw tire and the pressure of the nitrogen gas in the medium circulation path 21 is virtually the same, then by opening the medium supply valve 35 and at the same time opening the bypass valve 34 and closing the medium recovery valve 32, then it is possible to shorten the time taken for the pressure of the nitrogen gas in the internal space 2 of the raw tire to reach a desired pressure, similarly to the foregoing. By then closing the bypass valve 34 and opening the medium recovery valve 32 at the moment that the pressure of the nitrogen gas measured by the first pressure sensor 3 and the pressure of the nitrogen gas measured by the second pressure sensor 12 approach the same pressure, the nitrogen gas starts to be circulated in the medium circulation path 21, the medium supply path 22 and the medium recovery path 23.

On the other hand, if the pressure of the nitrogen gas in the internal space 2 of the raw tire is higher than the pressure of the nitrogen gas in the medium circulation path 21, then by opening the medium supply valve 35 and at the same time opening the bypass valve 34 and closing the medium recovery valve 32, it is possible to shorten the time until the pressure of the nitrogen gas in the internal space 2 of the raw tire reaches a desired pressure, similarly to the foregoing. In this case, since the high-pressure nitrogen gas never flows suddenly into the internal space 2 of the raw tire, it is possible to set the first pressure control valve 37 to a fully open state from the very start. By then closing the bypass valve 34 and opening the medium recovery valve 32 at the moment that the pressure of the nitrogen gas measured by the first pressure sensor 3 and the pressure of the nitrogen gas measured by the second pressure sensor 12 approach the same pressure, the nitrogen gas starts to be circulated in the medium circulation path 21, the medium supply path 22 and the medium recovery path 23.

Consequently, by controlling the first pressure control valve 37, the second pressure control valve 33, the medium supply valve 35, the medium recovery valve 32, the exhaust valve 31 and the bypass valve 34 appropriately on the basis of the signal from the first pressure sensor 3 and the signal from the second pressure sensor 12, beneficial effects are obtained in that, for instance, the time taken for the pressure of the nitrogen gas in the internal space 2 of the raw tire to reach the desired pressure can be shortened, and consequently it is possible to improve productivity yet further.

The explanation next discusses the results of an experiment investigating the effects on the rise in the tire temperature at the start of the vulcanization of the raw tire 13 of the retention time during which the nitrogen gas remains inside the internal space 2 of the raw tire, in other words, inside the bladder, in a tire vulcanizing apparatus and a tire vulcanizing method such as those of the respective embodiments described above.

In this experiment, the retention time τ of the nitrogen gas inside the bladder was adjusted by altering the blowing rate F of the medium circulation apparatus 6, and the change in the tire temperature T with the passage of the vulcanization time t was measured respectively for a retention time τ of the nitrogen gas of 0.5 seconds, 1.5 seconds and 2.5 seconds.

Figure 3:
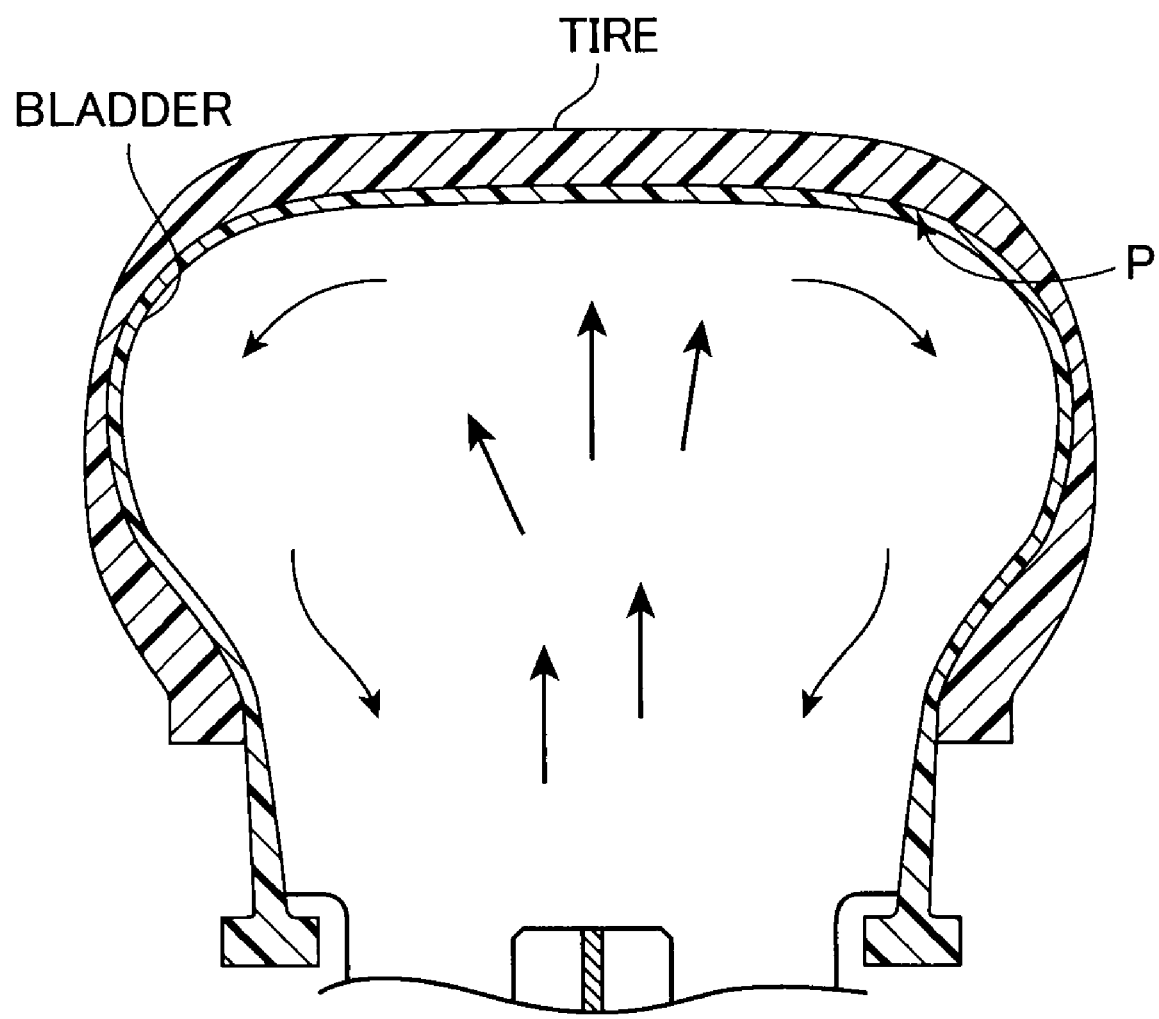
FIG. 3 is a cross-sectional diagram of a tire and a bladder for explaining a measurement position where the tire temperature is measured in an experiment for investigating change in the rise of the tire temperature in accordance with the retention time of the nitrogen gas inside the bladder.

In this experiment, the retention time τ of the nitrogen gas inside the bladder is expressed at τ=V/F. In this relationship, V is the internal volume of the bladder. Moreover, in the experiment, the blowing rate F of the medium circulation apparatus 6 for obtaining the desired retention time τ was decided on the basis of this relationship. Furthermore, the tire temperature T was the temperature measured at the inner liner shoulder section of the inner surface of the tire as indicated by point P in FIG. 3. The results of this experiment are shown respectively in FIG. 4 and FIG. 5, where FIG. 4 shows the experimental results when forming a tire of size 175/65 R14 and FIG. 5 shows the experimental results when forming a tire of size 205/60 R15.

Figure 4:
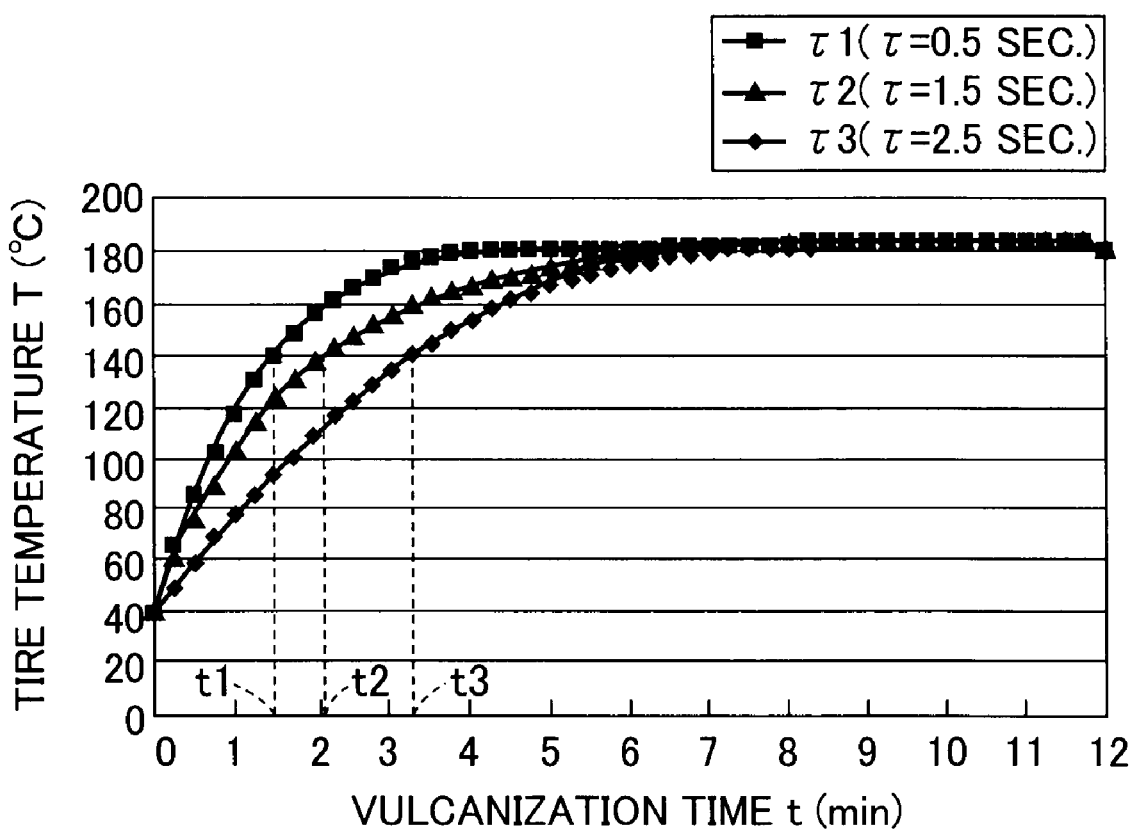
FIG. 4 is a diagram showing the experimental results of investigating the rise in the tire temperature in accordance with the retention time of the nitrogen gas inside the bladder, in the case of forming a tire having a size of 175/65 R14.
Figure 5:
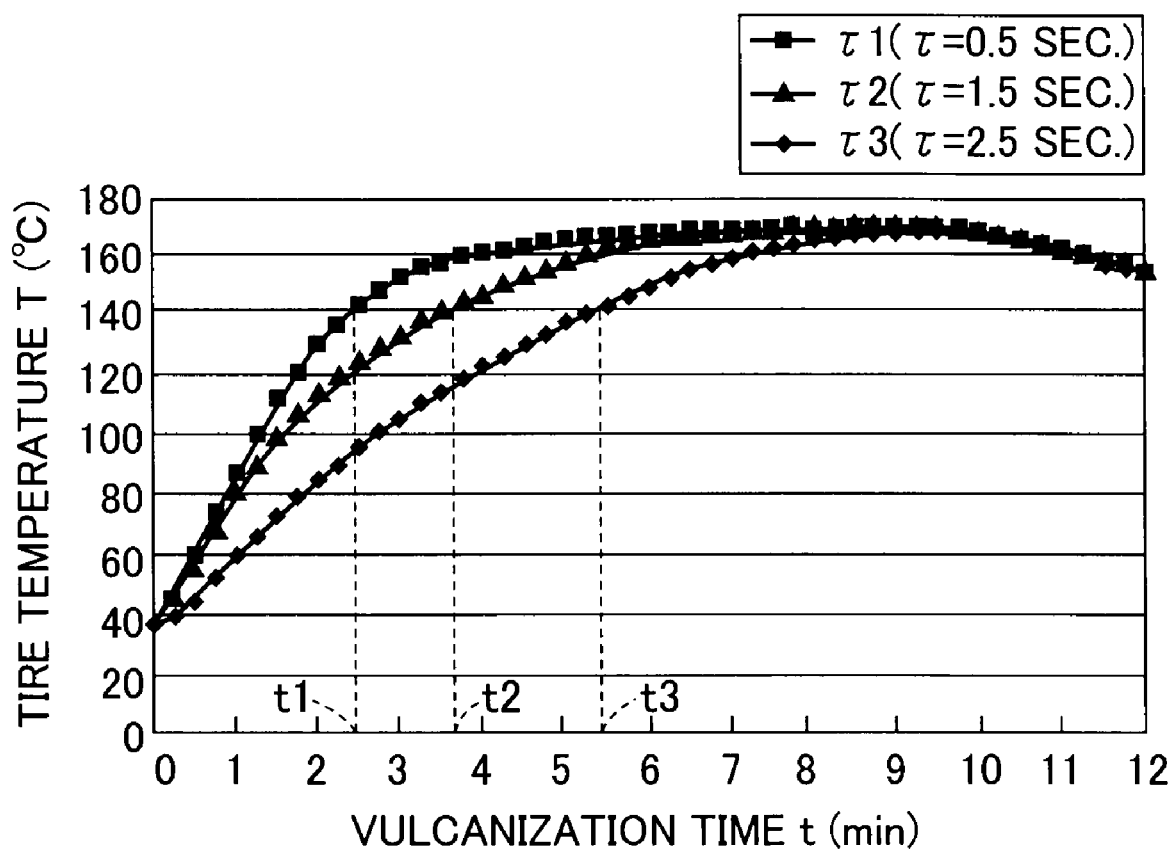
FIG. 5 is a diagram showing the experimental results of investigating the rise in the tire temperature in accordance with the retention time of the nitrogen gas inside the bladder, in the case of forming a tire having a size of 205/60 R15.

From the results in FIG. 4 and FIG. 5, it can be seen that if the retention time τ of the nitrogen gas is increased to 2.5 seconds, in other words, in the case of τ3 in the drawings, the rise of the tire temperature T is relatively gentle and the time taken for the tire temperature T to rise to approximately 140° C. at which the vulcanization reaction commences, from the start of vulcanization, is relatively long. In this case, there is a risk of problems in that the time required for vulcanization of the tire becomes longer and the productivity declines.

On the other hand, it can be seen that if the retention time τ of the nitrogen gas is shortened to 0.5 seconds, in other words, in the case of τ1 in the drawings, the rise of the tire temperature T becomes relatively sharp and the tire temperature T can be raised in a relatively short period of time until approximately 140° C. where the vulcanization reaction starts, from the start of vulcanization. However, if it is sought to shorten the retention time τ of the nitrogen gas in this way, it is necessary to increase considerably the blowing rate of the medium circulation apparatus 6 and to increase considerably the flow speed of the nitrogen gas, and this gives rise to significant increase in the power consumption of the medium circulation apparatus 6, and the need to use a medium circulation apparatus 6 having a greater capacity, and thus leads to increased costs, and the like.

Consequently, from these experimental results, it is considered that controlling the retention time τ of the nitrogen gas inside the bladder from approximately one second to approximately two seconds by controlling the blowing rate of the medium circulation apparatus 6 is effective in suppressing increase in costs, while also improving productivity.

Embodiments of the present invention were described above, but the present invention is not limited to the embodiments described above and it is possible to implement the invention with various modifications within the scope of the claims.

For example, in the embodiment described above, preheating of nitrogen gas is carried out in parallel with the task of accommodating the raw tire 13 inside the mold 14, but in a step of vulcanizing a plurality of raw tires 13 in a continuous fashion, it is also possible to start the preheating of the nitrogen gas used in the vulcanization of the next raw tire 13 in the later phase of the vulcanization of the preceding raw tire 13.

More specifically, in the later phase of vulcanization of the preceding raw tire 13, the medium supply valve 35 and the medium recovery valve 32 are closed, and furthermore the medium circulation apparatus 6 and the heating unit 8 are halted, and the vulcanization of the preceding raw tire 13 is carried out in a state where the nitrogen gas is closed inside the medium supply path 22, the medium recovery path 23 and the internal space 2 of the raw tire, which are sealed off between the valves 35 and 32. In this later phase of vulcanization, the amount of heat required to vulcanize the raw tire 13 is not very high, and therefore it is possible to make the vulcanization of the raw tire 13 progress by means of the residual heat in the nitrogen gas which has been closed in this way.

In other words, by opening the bypass valve 34, a closed circuit for circulating the nitrogen gas inside the medium circulation path 21 is formed. While the vulcanization of the preceding raw tire 13 has not yet been completed, the medium circulation apparatus 6 is restarted and the heating by the heating unit 8 is restarted after a prescribed time period from halting the medium circulation apparatus 6 and the heating unit 8, thereby starting preheating of the nitrogen gas while circulating the nitrogen gas in the medium circulation path 21. Subsequently, when the vulcanization of the preceding raw tire 13 has been completed, the raw tire 13 is removed from the mold 14 and furthermore, the next raw tire 13 is accommodated inside the mold 14 and vulcanization of the next raw tire 13 is started by supplying the nitrogen gas that has been preheated to the internal space 2 of the raw tire, similarly to the embodiment described above.

According to this composition, it is possible to lengthen the time period of preheating the nitrogen gas compared to the embodiment described above, and therefore it is possible to supply the nitrogen gas to the vulcanization of the next raw tire 13 in a more adequately heated state. Therefore, it is possible to shorten the temperature rise time of the internal space 2 of the raw tire yet further.

Summary of the Present Embodiment

The present embodiment can be summarized as follows.

In other words, the tire vulcanizing apparatus according to the present embodiment comprises: a mold which removably accommodates a raw tire; a medium path, connected to an internal space of the raw tire accommodated in the mold, for passing a heating and pressurizing medium of a gas or air for vulcanizing and molding the raw tire; a pressure sensor, provided in the medium path, for measuring a pressure of the heating and pressurizing medium; a pressure control valve, provided in the medium path, for controlling the pressure of the heating and pressurizing medium passing through the medium path on the basis of a signal from the pressure sensor; a temperature sensor, provided in the medium path, for measuring a temperature of the heating and pressurizing medium; and a heating unit, provided in the medium path, for controlling the temperature of the heating and pressurizing medium passing through the medium path on the basis of a signal from the temperature sensor; wherein the pressure control valve and the heating unit control the pressure and temperature of the heating and pressurizing medium supplied from the medium path to the internal space of the raw tire respectively and independently.

By adopting this composition, the pressure of the heating and pressurizing medium supplied to the internal space of the raw tire is controlled by means of a pressure control valve on the basis of a specified pressure of the heating and pressurizing medium, while the temperature of the heating and pressurizing medium supplied to the internal space of the raw tire is controlled by the heating unit on the basis of a specified temperature of the heating and pressurizing medium, and therefore the pressure and temperature of the heating and pressurizing medium supplied to the internal space of the raw tire can be controlled independently without the one condition affecting the other. Accordingly, since the pressure of the internal space of the raw tire can be controlled independently of the vulcanization temperature, then vulcanization of the raw tire can be carried out at an optimal temperature in accordance with the compound of the tire, and consequently the physical properties of the tire can be improved. Furthermore, as well as applying a design reliably to the outer surface of the tire, in other words, transferring a pattern to the tire, it is also possible to reduce external appearance defects and molding defects in the tire caused by the air blockages described above, or the like.

Furthermore, if the pressure rise time of the heating and pressurizing medium in the internal space of the raw tire is controlled by means of a pressure control valve, it is possible to vulcanize and mold a tire having little distortion in the outer circumferential direction (the equatorial direction) and the breadthways direction. Consequently, it is possible to improve the uniformity of the tire, such as the tire balance. Moreover, since the temperature of the internal space of the raw tire can be controlled by the heating unit, irrespectively of the pressure rise time of the internal space of the raw tire, then it is possible to shorten the vulcanization time of the raw tire and consequently productivity can be improved.

Desirably, the tire vulcanizing apparatus described above further comprises: a pressure controller which controls the pressure of the heating and pressurizing medium passing through the medium path by controlling an opening of the pressure control valve on the basis of the signal from the pressure sensor; and a temperature controller which controls the temperature of the heating and pressurizing medium passing through the medium path independently of the pressure control of the heating and pressurizing medium by the pressure controller, by controlling heating power of the heating unit on the basis of the signal from the temperature sensor.

By adopting this composition, it is possible to control the pressure control valve and the heating unit independently by means of the pressure controller and the temperature controller. Consequently, it is possible to create a structure whereby the pressure and temperature of the heating and pressurizing medium supplied from the medium path to the internal space of the raw tire can be controlled respectively and independently.

Desirably, in the tire vulcanizing apparatus described above, the medium path comprises: a medium circulation path for circulating the heating and pressurizing medium in order to preheat the medium; a medium supply path, provided so as to connect the medium circulation path with the internal space of the raw tire, for supplying the heating and pressurizing medium from the medium circulation path to the internal space of the raw tire; and a medium recovery path, provided so as to connect the medium circulation path with the internal space of the raw tire, for recovering the heating and pressurizing medium from the internal space of the raw tire to the medium circulation path; wherein the pressure sensor comprises a first pressure sensor provided in the medium recovery path; the pressure control valve comprises a first pressure control valve provided in the medium supply path; and the temperature sensor and the heating unit are both provided in the medium circulation path.

In this composition, the pressure of the heating and pressurizing medium is measured by the first pressure sensor in the medium recovery path which is positioned close to the internal space of the raw tire, in the medium path. In other words, a pressure which is substantially equal to the pressure of the internal space of the raw tire can be measured as a pressure signal that is used as a basis for pressure control. Furthermore, since the first pressure control valve is provided in the medium supply path, which is close to the position where the heating and pressurizing medium is supplied to the internal space of the raw tire in the medium path, then if the pressure of the heating and pressurizing medium is controlled by means of this first pressure control valve, it is possible to shorten the response time of the pressure change in the heating and pressurizing medium inside the internal space of the raw tire with respect to this pressure control. Accordingly, the pressure of the heating and pressurizing medium in the internal space of the raw tire can be controlled more easily. Furthermore, since the heating unit is provided in the medium circulation path, then it is possible to preheat the heating and pressurizing medium by means of the heating unit while the medium is circulating in the medium circulation path before flowing into the medium supply path. Consequently, it is possible to shorten the rise time taken for the temperature of the heating and pressurizing medium supplied to the internal space of the raw tire directly after the start of vulcanization to rise to the desired temperature.

Desirably, the tire vulcanizing apparatus described above further comprises: a heating and pressurizing medium supply source which supplies the heating and pressurizing medium; wherein the medium path comprises: a medium circulation path for circulating the heating and pressurizing medium in order to preheat the medium; a medium supply path, provided so as to connect the medium circulation path with the internal space of the raw tire, for supplying the heating and pressurizing medium from the medium circulation path to the internal space of the raw tire; a medium recovery path, provided so as to connect the medium circulation path with the internal space of the raw tire, for recovering the heating and pressurizing medium from the internal space of the raw tire to the medium circulation path; and a medium supply source path, which branches from the medium circulation path to the heating and pressurizing medium supply source, for introducing the heating and pressurizing medium supplied from the heating and pressurizing medium supply source to the medium circulation path; the pressure sensor comprises a first pressure sensor provided in the medium recovery path; the pressure control valve comprises a second pressure control valve provided in the medium supply source path; and the temperature sensor and the heating unit are both provided in the medium circulation path.

In this composition, the pressure of the heating and pressurizing medium is measured by the first pressure sensor in the medium recovery path which is positioned close to the internal space of the raw tire, in the medium path. In other words, a pressure which is substantially equal to the pressure of the internal space of the raw tire can be measured as a pressure signal that is used as a basis for pressure control. Accordingly, the pressure of the heating and pressurizing medium in the internal space of the raw tire can be controlled more easily. Furthermore, since the heating unit is provided in the medium circulation path, then it is possible to preheat the heating and pressurizing medium by means of the heating unit while the medium is circulating in the medium circulation path before flowing into the medium supply path. Consequently, it is possible to shorten the rise time taken for the temperature of the heating and pressurizing medium supplied to the internal space of the raw tire directly after the start of vulcanization to rise to the desired temperature. Moreover, since the second pressure control valve is provided in the medium supply source path for introducing the heating and pressurizing medium into the medium circulation path, then it is possible to control the pressure of the heating and pressurizing medium by means of the second pressure control valve at the stage of preheating the heating and pressurizing medium in the medium circulation path. By this means, it is possible to adjust the supply pressure of the heating and pressurizing medium supplied to the internal space of the raw tire at the start of vulcanization to a desired supply pressure in advance. This serves to shorten the pressure rise time in the internal space of the raw tire at the start of vulcanization.

In this case, desirably, a medium circulation apparatus for circulating the heating and pressurizing medium is provided in the medium circulation path; and the medium supply source path branches from the portion of the medium circulation path which is located between a position where the medium recovery path is connected and the position where the medium circulation apparatus is provided, on an upstream side of the medium circulation apparatus in terms of a direction of flow of the heating and pressurizing medium.

By means of this composition, it is possible to adjust the pressure of the heating and pressurizing medium on the upstream side of the medium circulation apparatus, in other words, on the input side of the medium circulation apparatus, by means of the second pressure control valve which is provided in the medium supply source path. Therefore, it is possible to suppress increase in the pressure differential between the pressure of the heating and pressurizing medium on the downstream side of the medium circulation apparatus, in other words, the output side of the medium circulation apparatus, and the pressure of the heating and pressurizing medium on the input side of the medium circulation apparatus, by controlling the input-side pressure of the medium circulation apparatus by means of this second pressure control valve, and consequently, increase in the load on the medium circulation apparatus can be suppressed.

In a composition where the pressure control valve comprises a second pressure control valve, desirably, the pressure control valve includes a first pressure control valve provided in the medium supply path, in addition to the second pressure control valve.

In this composition, since the first pressure control valve is provided in the medium supply path, which is close to the position where the heating and pressurizing medium is supplied to the internal space of the raw tire in the medium path, then it is possible to shorten the response time of the pressure change in the heating and pressurizing medium inside the internal space of the raw tire with respect to pressure control performed by this first pressure control valve. Furthermore, since the second pressure control valve is provided in the medium supply source path, then it is possible to control the pressure of the heating and pressurizing medium at the stage of preheating the heating and pressurizing medium, and the supply pressure of the heating and pressurization device at the start of vulcanization can be controlled in advance to a desired supply pressure. In other words, in the case of this composition, it is possible to obtain both a beneficial effect in that the response time of the pressure in the internal space of the raw tire can be shortened and a beneficial effect in that the supply pressure of the heating and pressurizing medium can be adjusted to a desired supply pressure in advance, at the start of vulcanization. Consequently, a beneficial effect can be obtained in that the pressure of the heating and pressurizing medium inside the internal space of the raw tire can be controlled more easily.

In this case, desirably, the medium path includes a exhaust path which branches from the medium recovery path which is located between a position where the first pressure sensor is provided and a position connected to the medium circulation path, the tire vulcanizing apparatus further comprises: a medium supply valve provided in the medium supply path between a position connected to the medium circulation path and a position where the first pressure control valve is provided; a medium recovery valve provided in the medium recovery path between a position where the exhaust path branches off and the position connected to the medium circulation path; an exhaust valve provided in the exhaust path; and a bypass valve provided in the medium circulation path between a position connected to the medium supply path and a position connected to the medium recovery path; wherein the pressure sensor includes a second pressure sensor provided in the medium circulation path in addition to the first pressure sensor; and degrees of opening of the pressure control valve, the medium supply valve, the medium recovery valve, the exhaust valve and the bypass valve are adjusted on the basis of a signal from the first pressure sensor and a signal from the second pressure sensor.

In this composition, by suitably controlling the degrees of opening of the first pressure control valve, the second pressure control valve, the medium supply valve, the medium recovery valve, the exhaust valve and the bypass valve, on the basis of the signal from the first pressure sensor and the signal from the second pressure sensor, it is possible to obtain beneficial effects in terms of being able to shorten the time period until the pressure of the heating and pressurizing medium in the internal space of the raw tire reaches a desired pressure, and hence productivity can be improved further.

Furthermore, the tire vulcanizing method relating to the present invention comprises: a pressure measurement step of measuring the pressure of a heating and pressurizing medium by means of a pressure sensor provided in a medium path for passing a heating and pressurizing medium of a gas or air for vulcanizing and molding a raw tire, the medium path being connected to an internal space of the raw tire; a pressure control step of controlling the pressure of the heating and pressurizing medium on the basis of a signal from the pressure sensor by means of a pressure control valve provided in the medium path; a temperature measurement step of measuring a temperature of the heating and pressurizing medium by means of a temperature sensor provided in the medium path; and a temperature control step of controlling the temperature of the heating and pressurizing medium by means of a heating unit provided in the medium path on the basis of a signal from the temperature sensor; wherein the pressure and temperature of the heating and pressurizing medium supplied from the medium path to the internal space of the raw tire are controlled respectively and independently in the pressure control step and the temperature control step.

By adopting this composition, it is possible to control the pressure and temperature of the heating and pressurizing medium supplied to the internal space of the raw tire, independently, without the one condition affecting the other, by means of the pressure control step and the temperature control step. By this means, similar beneficial effects to those of the tire vulcanizing apparatus described above are obtained. In other words, since the pressure of the internal space of the raw tire can be controlled independently of the vulcanization temperature, then vulcanization of the raw tire can be carried out at an optimal temperature in accordance with the compound of the tire, and consequently the physical properties of the tire can be improved. Furthermore, as well as applying a design reliably to the outer surface of the tire, in other words, transferring a pattern to the tire, it is also possible to reduce external appearance defects and molding defects in the tire caused by the air blockages described above, or the like.

Furthermore, if the pressure rise time of the heating and pressurizing medium supplied into the internal space of the raw tire is controlled in the pressure control step, then it is possible to vulcanize and mold a tire having little distortion in the outer circumferential direction (the equatorial direction) and the breadthways direction. Consequently, it is possible to improve the uniformity of the tire, such as the tire balance. Furthermore, since the temperature of the internal space of the raw tire can be controlled irrespectively of the pressure rise time of the heating and pressurizing medium, it is possible to shorten the vulcanization time and consequently, productivity can be improved.

In this case, desirably, the medium path comprises: a medium circulation path for circulating the heating and pressurizing medium in order to preheat the medium; a medium supply path, connecting the medium circulation path with the internal space of the raw tire, for supplying the heating and pressurizing medium from the medium circulation path to the internal space of the raw tire; a medium recovery path, connecting the medium circulation path with the internal space of the raw tire, for recovering the heating and pressurizing medium from the internal space of the raw tire to the medium circulation path; and a medium supply source path, which branches from the medium circulation path to a heating and pressurizing medium supply source, for introducing the heating and pressurizing medium supplied from the heating and pressurizing medium supply source to the medium circulation path; the temperature sensor and the heating unit are both provided in the medium circulation path; the pressure measurement step includes a step of measuring the pressure of the heating and pressurizing medium by means of a first pressure sensor provided in the medium recovery path; and the pressure control step includes a step of controlling the pressure of the heating and pressurizing medium on the basis of a signal from the first pressure sensor, by means of a second pressure control valve which is provided in the medium supply source path.

By adopting this composition, in the pressure measurement step, the pressure of the heating and pressurizing medium is measured by the first pressure sensor in the medium recovery path which is positioned close to the internal space of the raw tire, in the medium path. In other words, a pressure which is substantially equal to the pressure of the internal space of the raw tire can be measured as a pressure signal that is used as a basis for pressure control. Furthermore, by means of the pressure control step described above, it is possible to adjust the pressure of the heating and pressurizing medium by means of the second pressure control valve, at the stage of preheating the heating and pressurizing medium in the medium circulation path. By this means, it is possible to adjust the supply pressure of the heating and pressurizing medium supplied to the internal space of the raw tire at the start of vulcanization to a desired supply pressure in advance. This serves to shorten the pressure rise time in the internal space of the raw tire at the start of vulcanization.

Furthermore, by means of the heating unit provided in the medium circulation path, it is possible to preheat the heating and pressurizing medium while the medium is circulating in the medium circulation path before flowing into the medium supply path. By this means, it is possible to shorten the rise time taken for the temperature of the heating and pressurizing medium supplied to the internal space of the raw tire directly after the start of vulcanization to rise to the desired temperature.

In this case, desirably, the pressure control step includes a step of controlling the pressure of the heating and pressurizing medium on the basis of the signal from the first pressure sensor, by means of a first pressure control valve which is provided in the medium supply path and/or the second pressure control valve.

In this composition, since the pressure of the heating and pressurizing medium can be controlled in the medium supply path which is close to the position where the heating and pressurizing medium is supplied to the internal space of the raw tire in the medium path, by the first pressure control valve, then it is possible to shorten the response time of the pressure change in the heating and pressurizing medium inside the internal space of the raw tire with respect to the pressure control performed by the first pressure control valve. Furthermore, since the pressure of the heating and pressurizing medium can be adjusted at the stage of preheating the heating and pressurizing medium in the medium circulation path by the second pressure control valve, as described above, it is possible to adjust the supply pressure of the heating and pressurizing medium supplied to the internal space of the raw tire at the start of vulcanization to a desired supply pressure, in advance. This serves to shorten the pressure rise time in the internal space of the raw tire at the start of vulcanization.

The invention claimed is:

1. A tire vulcanizing apparatus comprising:
a mold for removably accommodating a raw tire;
a medium path, connected to an internal space of the raw tire accommodated in the mold, for passing a heating and pressurizing medium of a gas or air for vulcanizing and molding the raw tire;
a pressure sensor, provided in the medium path, for measuring a pressure of the heating and pressurizing medium;
a pressure control valve, provided in the medium path, for controlling the pressure of the heating and pressurizing medium passing through the medium path on the basis of a signal from the pressure sensor;
a temperature sensor, provided in the medium path, for measuring a temperature of the heating and pressurizing medium; and
a heating unit, provided in the medium path, for controlling the temperature of the heating and pressurizing medium passing through the medium path on the basis of a signal from the temperature sensor, wherein
the pressure control valve controls the pressure of the heating and pressurizing medium passing through the medium path on the basis of a signal from the pressure sensor and not on the basis of a signal from the temperature sensor, and wherein the heating unit controls the temperature of the heating and pressurizing medium passing through the medium path on the basis of a signal from the temperature sensor and not on the basis of a signal from the pressure sensor, whereby the pressure and temperature of the heating and pressurizing medium supplied from the medium path to the internal space of the raw tire are respectively independently controlled without mutual relationship.

2. The tire vulcanizing apparatus according to claim 1, further comprising:
a pressure controller for controlling the pressure of the heating and pressurizing medium passing through the medium path by controlling an opening degree of the pressure control valve on the basis of the signal from the pressure sensor; and
a temperature controller for controlling the temperature of the heating and pressurizing medium passing through the medium path independently of the pressure control of the heating and pressurizing medium by the pressure controller, by controlling heating power of the heating unit on the basis of the signal from the temperature sensor.

3. A tire vulcanizing apparatus comprising:
a mold for removably accommodating a raw tire;
a medium path, connected to an internal space of the raw tire accommodated in the mold, for passing a heating and pressurizing medium of a gas or air for vulcanizing and molding the raw tire;
a pressure sensor, provided in the medium path, for measuring a pressure of the heating and pressurizing medium;
a pressure control valve, provided in the medium path, for controlling the pressure of the heating and pressurizing medium passing through the medium path on the basis of a signal from the pressure sensor;
a temperature sensor, provided in the medium path, for measuring a temperature of the heating and pressurizing medium; and
a heating unit, provided in the medium path, for controlling the temperature of the heating and pressurizing medium passing through the medium path on the basis of a signal from the temperature sensor, wherein
the pressure control valve and the heating unit control the pressure and temperature of the heating and pressurizing medium supplied from the medium path to the internal space of the raw tire respectively and independently, wherein
the medium path includes: a medium circulation path for circulating the heating and pressurizing medium in order to preheat the medium; a medium supply path, provided so as to connect the medium circulation path with the internal space of the raw tire, for supplying the heating and pressurizing medium from the medium circulation path to the internal space of the raw tire; and a medium recovery path, provided so as to connect the medium circulation path with the internal space of the raw tire, for recovering the heating and pressurizing medium from the internal space of the raw tire to the medium circulation path,
the pressure sensor includes a first pressure sensor provided in the medium recovery path,
the pressure control valve includes a first pressure control valve provided in the medium supply path, and the temperature sensor and the heating unit are both provided in the medium circulation path.

4. A tire vulcanizing apparatus comprising:
a mold for removably accommodating a raw tire;
a medium path, connected to an internal space of the raw tire accommodated in the mold, for passing a heating and pressurizing medium of a gas or air for vulcanizing and molding the raw tire;
a pressure sensor, provided in the medium path, for measuring a pressure of the heating and pressurizing medium;
a pressure control valve, provided in the medium path, for controlling the pressure of the heating and pressurizing medium passing through the medium path on the basis of a signal from the pressure sensor;
a temperature sensor, provided in the medium path, for measuring a temperature of the heating and pressurizing medium; and
a heating unit, provided in the medium path, for controlling the temperature of the heating and pressurizing medium passing through the medium path on the basis of a signal from the temperature sensor, wherein
the pressure control valve and the heating unit control the pressure and temperature of the heating and pressurizing medium supplied from the medium path to the internal space of the raw tire respectively and independently, further comprising a heating and pressurizing medium supply source for supplying the heating and pressurizing medium, wherein the medium path includes: a medium circulation path for circulating the heating and pressurizing medium in order to preheat the medium; a medium supply path, provided so as to connect the medium circulation path with the internal space of the raw tire, for supplying the heating and pressurizing medium from the medium circulation path to the internal space of the raw tire; a medium recovery path, provided so as to connect the medium circulation path with the internal space of the raw tire, for recovering the heating and pressurizing medium from the internal space of the raw tire to the medium circulation path; and a medium supply source path, which branches from the medium circulation path to the heating and pressurizing medium supply source, for introducing the heating and pressurizing medium supplied from the heating and pressurizing medium supply source to the medium circulation path,
the pressure sensor includes a first pressure sensor provided in the medium recovery path,
the pressure control valve includes a second pressure control valve provided in the medium supply source path, and
the temperature sensor and the heating unit are both provided in the medium circulation path.

5. The tire vulcanizing apparatus according to claim 4, wherein
a medium circulation apparatus for circulating the heating and pressurizing medium is provided in the medium circulation path; and
the medium supply source path branches from a portion of the medium circulation path which is located between a position where the medium recovery path is connected and a position where the medium circulation apparatus is provided, on an upstream side of the medium circulation apparatus in terms of a direction of flow of the heating and pressurizing medium.

6. The tire vulcanizing apparatus according to claim 4, wherein the pressure control valve includes a first pressure control valve provided in the medium supply path, in addition to the second pressure control valve.

7. The tire vulcanizing apparatus according to claim 6, wherein
the medium path includes a exhaust path which branches from the medium recovery path which is located between a position where the first pressure sensor is provided and a position connected to the medium circulation path,
the tire vulcanizing apparatus further comprising:
a medium supply valve provided in the medium supply path between a position connected to the medium circulation path and a position where the first pressure control valve is provided;
a medium recovery valve provided in the medium recovery path between a position where the exhaust path branches off and the position connected to the medium circulation path;
an exhaust valve provided in the exhaust path; and
a bypass valve provided in the medium circulation path between a position connected to the medium supply path and a position connected to the medium recovery path, wherein the pressure sensor includes a second pressure sensor provided in the medium circulation path in addition to the first pressure sensor, and
degrees of opening of the pressure control valve, the medium supply valve, the medium recovery valve, the exhaust valve and the bypass valve are adjusted on the basis of a signal from the first pressure sensor and a signal from the second pressure sensor.

8. A tire vulcanizing method, comprising:
a pressure measurement step of measuring a pressure of a heating and pressurizing medium by means of a pressure sensor provided in a medium path for passing a heating and pressurizing medium of a gas or air for vulcanizing and molding a raw tire, the medium path being connected to an internal space of the raw tire;
a pressure control step of controlling the pressure of the heating and pressurizing medium on the basis of a signal from the pressure sensor by means of a pressure control valve provided in the medium path;
a temperature measurement step of measuring a temperature of the heating and pressurizing medium by means of a temperature sensor provided in the medium path; and
a temperature control step of controlling the temperature of the heating and pressurizing medium by means of a heating unit provided in the medium path on the basis of a signal from the temperature sensor, wherein
the pressure of the heating and pressurizing medium supplied from the medium path to the internal space of the raw tire is controlled without reliance on the temperature measured in the temperature measurement step, and the temperature of the heating and pressurizing medium supplied from the medium path to the internal space of the raw tire is controlled without reliance on the pressure measured in the pressure measurement step, whereby the pressure and temperature of the heating and pressurizing medium supplied from the medium path to the internal space of the raw tire are respectively independently controlled without mutual relationship in the pressure control step and the temperature control step.

9. A tire vulcanizing method, comprising:
a pressure measurement step of measuring a pressure of a heating and pressurizing medium by means of a pressure sensor provided in a medium path for passing a heating and pressurizing medium of a gas or air for vulcanizing and molding a raw tire, the medium path being connected to an internal space of the raw tire;

a pressure control step of controlling the pressure of the heating and pressurizing medium on the basis of a signal from the pressure sensor by means of a pressure control valve provided in the medium path;

a temperature measurement step of measuring a temperature of the heating and pressurizing medium by means of a temperature sensor provided in the medium path; and a temperature control step of controlling the temperature of the heating and pressurizing medium by means of a heating unit provided in the medium path on the basis of a signal from the temperature sensor, wherein the pressure and temperature of the heating and pressurizing medium supplied from the medium path to the internal space of the raw tire are controlled respectively and independently in the pressure control step and the temperature control step, wherein the medium path includes: a medium circulation path for circulating the heating and pressurizing medium in order to preheat the medium; a medium supply path connecting the medium circulation path with the internal space of the raw tire, for supplying the heating and pressurizing medium from the medium circulation path to the internal space of the raw tire; a medium recovery path connecting the medium circulation path with the internal space of the raw tire, for recovering the heating and pressurizing medium from the internal space of the raw tire to the medium circulation path; and a medium supply source path branching from the medium circulation path to a heating and pressurizing medium supply source, for introducing the heating and pressurizing medium supplied from the heating and pressurizing medium supply source to the medium circulation path, the temperature sensor and the heating unit are both provided in the medium circulation path, the pressure measurement step includes a step of measuring the pressure of the heating and pressurizing medium by means of a first pressure sensor provided in the medium recovery path, and the pressure control step includes a step of controlling the pressure of the heating and pressurizing medium on the basis of a signal from the first pressure sensor, by means of a second pressure control valve which is provided in the medium supply source path.

10. The tire vulcanizing method according to claim 9, wherein the pressure control step includes a step of controlling the pressure of the heating and pressurizing medium on the basis of the signal from the first pressure sensor, by means of a first pressure control valve which is provided in the medium supply path and/or the second pressure control valve.

* * * * *